United States Patent [19]

Mizukado et al.

[11] Patent Number: 4,782,438
[45] Date of Patent: Nov. 1, 1988

[54] MEANS AND METHOD FOR TRANSLATING A TURRET PUNCH PRESS CONTROL PROGRAM INTO A LASER BEAM MACHINE CONTROL PROGRAM

[75] Inventors: Masayoshi Mizukado, Kani; Ken Yamazaki, Oobu; Masaki Ito, Aichi, all of Japan

[73] Assignee: Yamazaki Mazak Corporation, Niwa, Japan

[21] Appl. No.: 60,072

[22] Filed: Jun. 9, 1987

[30] Foreign Application Priority Data

Jun. 10, 1986 [JP] Japan .................................. 61-134326
Jun. 12, 1986 [JP] Japan .................................. 61-137085

[51] Int. Cl.⁴ .............................................. G05B 19/00
[52] U.S. Cl. ................................ 364/191; 364/474.08; 219/121.78
[58] Field of Search ............... 364/191, 192, 474, 475; 219/121 LG, 121 LU Primary Examiner—Jerry Smith
Assistant Examiner—Allen MacDonald
Attorney, Agent, or Firm—Cushman, Darby & Cushman

[57] ABSTRACT

A program translation calculating section translates a machining program of a turret punch press to a form which a laser beam machine is able to put into practice according to first and second translating program groups. The laser beam machine is drive controlled based on the translated machining program.

6 Claims, 26 Drawing Sheets

| TNO | CONFIGURATION | LENGTH | WIDTH | DIAMETER | ANGLE |
|---|---|---|---|---|---|
| 1 | SQUARE | 20 | 20 | | 45 |
| 2 | CIRCLE | | | 10 | |
| 3 | OBLONG | | | | |
| 4 | | | | | |
| 5 | | | | | |
| 6 | | | | | |
| 7 | | | | | |

| CIRCLE | SQUARE | OBLONG | SPECIAL | |

MEANS AND METHOD FOR TRANSLATING A TURRET PUNCH PRESS CONTROL PROGRAM INTO A LASER BEAM MACHINE CONTROL PROGRAM

FIELD OF THE INVENTION

This invention relates to a drive control method of a laser beam machine and a program translating apparatus for using a laser beam machine when laser beam machining is performed using a machining program of a turret punch press.

BACKGROUND OF THE INVENTION

Usually, a turret punch press or a laser beam machine is often used for metal sheeting, with the sheeting procedures for both of them being similar to each other in many respects. Therefore, a workpiece, which can be machined by the turret punch press, can also be machined by the laser beam machine in many instances.

Although the metal sheeting using the turret punch press has the advantage in that machining speed is fast since a predetermined area of the workpiece can be punched by its single punching action, it has the disadvantage in that it is not suitable for a production of small quantity and many kinds since an associated mold must be prepared.

Similarly, although the machining using the laser beam machine has the advantage in that much time and labor expended in preparing a mold can be eliminated since the machining configurations can be all prepared by a machining program and thus can be highly effective for a special configuration, etc. However, it has the disadvantages in that machining speed, etc. are slow when compared with the punch press and that machining efficiency is lowered in the case of a production of large quantities and few kinds.

On the other hand, the machining process using the turret punch press is established owing to the long history which the punch press machine has. Therefore, accumulation of machining programs for use of a turret punch press in machining sites such as factories, etc. is considerable. The laser beam machine, since its history for being used for metal sheeting is short, an associated accumulation of its machining programs is small. However, machining using the laser beam machine is advantageous in many cases owing to the fewer number of processes and costs, as compared to taking the trouble to prepare a mold for a turret punch press when a test sample, etc. are to be produced.

However, in the case where the laser beam machine is operated, all of the machining configurations must be instructed by a machining program as mentioned above. The procedure for preparing the machining program for a laser beam machine is naturally different from that of a turret punch press. Accordingly, an operator of the turret punch press is unable to take advantage of his knowledge of the machining program for the turret punch press and is obliged to newly obtain a sufficient knowledge of the machining program for the laser beam machine. Accordingly, it takes much time and labor in preparing new machining programs. In addition, the large amount of property of machining programs regarding the turret punch press become useless.

The first object of the present invention is to provide a drive control method of a laser beam machine, in which the machining programs regarding a turret punch press can be effectively used for machining using a laser beam machine and an operator, who has become an expert in preparing a machining program for the turret punch press, is able to operate the laser beam machine in the same manner as he did with the turret punch press.

The second object of the present invention is to provide a program translating apparatus for use of a laser beam machine, in which a machining program for the laser beam can be prepared in the same manner as the machining program for a turret punch press.

SUMMARY OF THE INVENTION

From one aspect of the present invention, there is provided a drive control method of a laser beam machine comprising the steps of translating a machining program, which was prepared for use of a turret punch press, to a machining program for use with a laser beam machine, and drive-controlling the laser beam machine according to such translated machining program.

From another aspect of the present invention, there is provided a program translating apparatus for use of a laser beam machine comprising a first memory means for storing a mold machining program which is used for machining a hole using the laser beam machine, the hole corresponding to the configuration of a punch hole which is formed by each mold of a turret punch press. Also, a second memory means is provided for storing a first translation program group adapted to calculate the position of each hole when one or more holes are machined using the same mold, such as single punch, bolt hole, arc, line at angle, grit, etc. and generating a machining path by the laser beam machine according to the mold machining program, which is stored in the first memory means with reference to the calculated hole position. Finally, a third memory means is provided for storing a second translation program group adapted to generate a machining path which is used when a predetermined area is machined by the laser beam machine when the predetermined area is successively machined by the turret punch press, such as circular nibbling, linear nibbling, rectangular nibbling, share proof, etc., and a program translation calculating section for reading out the first and second translation program groups, which are stored in the second and third memory means, according to a machining program of the turret punch press and generating a machining path of the laser beam machine from the machining program of the turret punch press according to the read out translation program groups.

According to the present invention, a program, which was prepared for use of a turret punch press, can be easily translated to a machinig program for use of a laser beam machine and run. Accordingly, a large amount of property of the machining programs regarding a turret punch press, which was accumulated in the past, can be effectively utilized for machining by means of the laser beam machine.

Furthermore, an operator, who has become an expert in preparation of a machining program of a turret punch press, is able to prepare and run a machining program of a laser beam machine without having a knowledge of the machining program regarding the laser beam machine. Accordingly, the preparation of the machining program regarding the laser beam machine can be rapidly and easily performed as the machining program of the turret punch press.

DESCRIPTION OF THE PREFERRED EMBODIMENT

The preferred embodiment of the present invention will be described hereinafter in detail with reference to the accompanying drawings.

Figure 1:
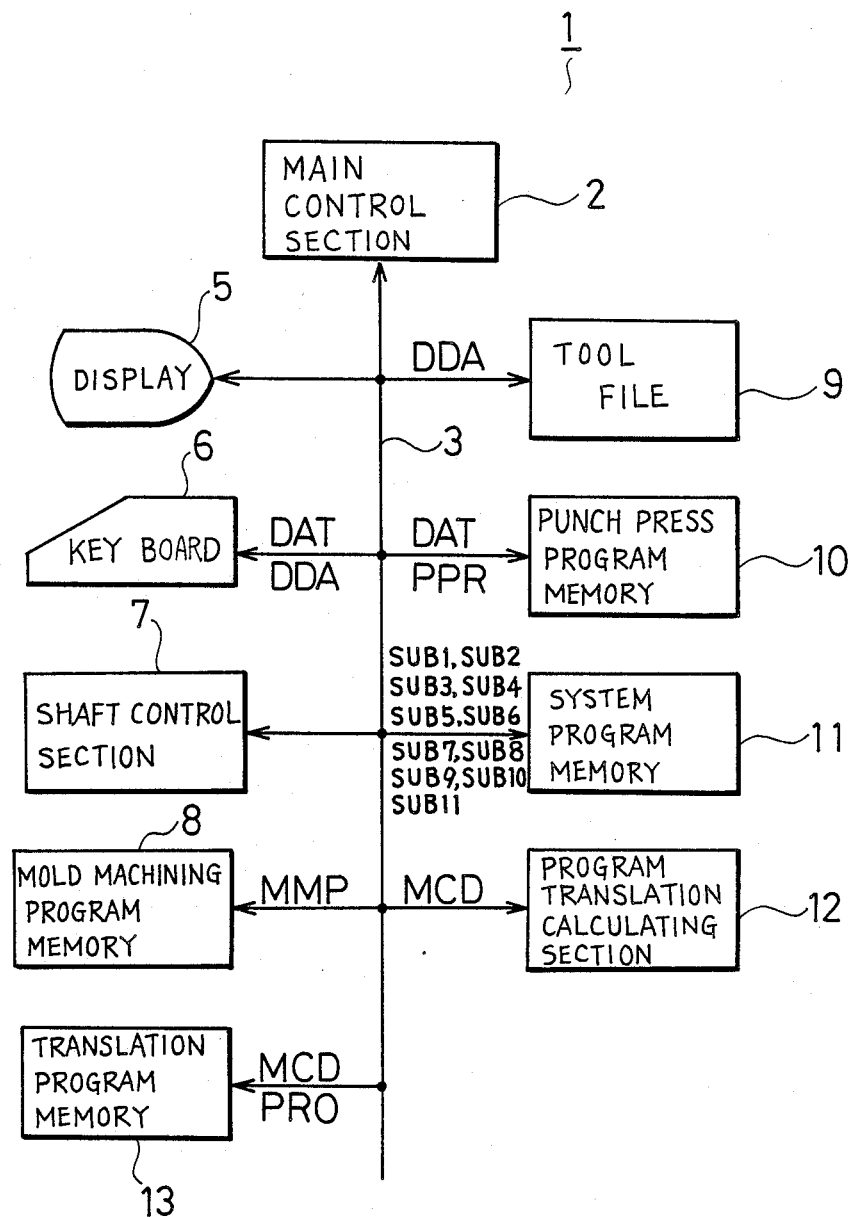
FIG. 1 is a control block diagram showing one embodiment of a laser beam machine to which the present invention can be applied.

A laser beam machine 1 has a main control section 2 as shown in FIG. 1. The main control section 2 is connected with a shaft control section 7 adapted to control the respective control shafts of a laser beam machine 4, a display 5, a key board 6, a mold machining program memory 8, a translation program memory 13, a tool file 9, a punch press program memory 10, a system program memory 11, a program translation calculating section 12, etc. through a bus line 3.

Since the laser beam machine 1 has the above-mentioned construction, an operator inputs from the key board 6 a machining command of a predetermined configuration by a turret punch press when a machining is performed using the laser beam machine 1. The laser beam machine 1 translates the inputted machining command to a machining command which the laser beam machine 1 is able to put into practice and generates a substantially equivalent path.

Figures 2, 3:
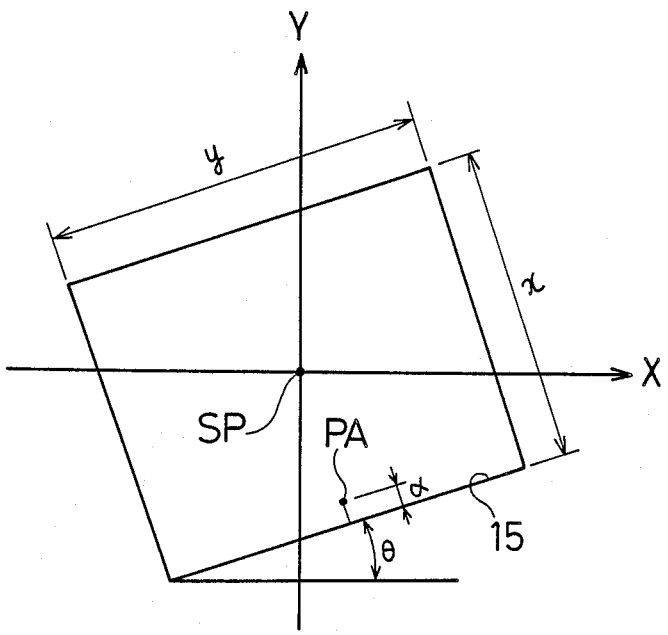
FIG. 2 is a schematic view showing a registration screen of a tool which is used for the turret punch press.
FIGS. 3 through 5 are schematic views showing a correlation of hole machining using the turret punch press and laser beam machine which are shown separately for a different configulation of each hole.

More specifically, the operator prepares a machining program regarding a turret punch press and inputs the same from the key board 6 (or otherwise an already prepared machining program regarding a turret punch press is inputted from a proper input means). First of all, as shown in FIG. 2, a mold (tool), which is to be used for machining, is registered. This registration is performed with regard to mold data DDA such as tool number TNO, mold configuration FIR, size SIZ, diameter DIA, setting angle AGL to the turret, etc. The mold data DDA inputted is stored in the tool file 9 and shown on the display 5 as shown in FIG. 2.

In this way, when the inputting of the mold data DDA from the key board 6 has been completed, a specific machining content is commanded by means of a G code (in the case an EIA/ISO code is used. Other code systems may of course be used). The machining commands by means of the G code using a turret punch press include the following.

(a) G00 (single punch)

Figure 6:
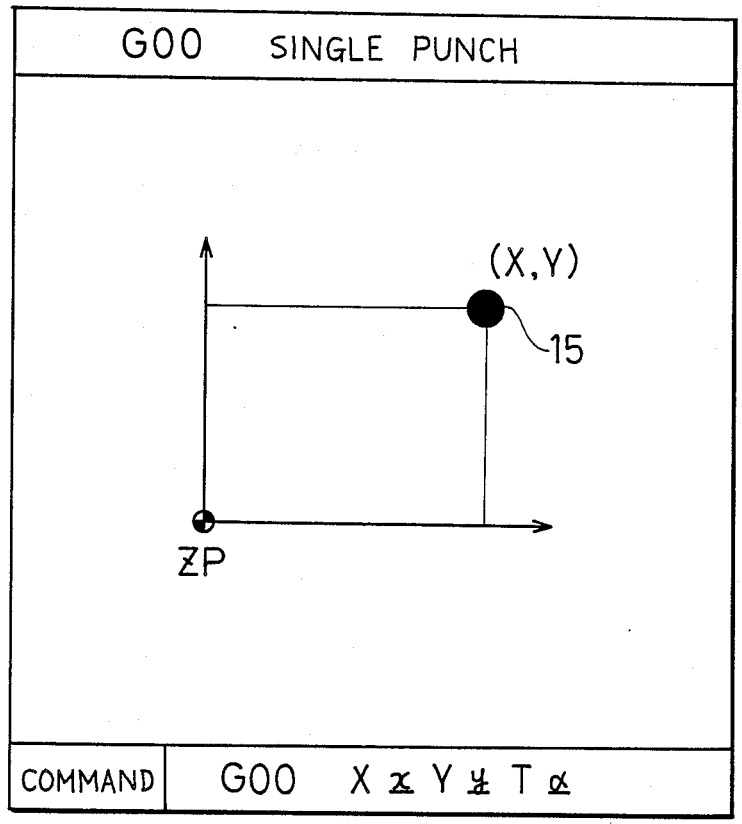
FIGS. 6 through 17 are schematic views showing the contents of machining command using a G code in the turret punch press.

G00, as shown in FIG. 6, denotes a punching action using a predetermined tool in a position of the coordinate (X,Y) with reference to the original point (ZP) of a workpiece, and the command thereof is carried out in the form of;

G00 X x Y y Tα wherein x and y denote a specific coordinate, and α denotes a tool number TNO of a mold to be used.

(b) G26 (bolt hole)

Figure 27:
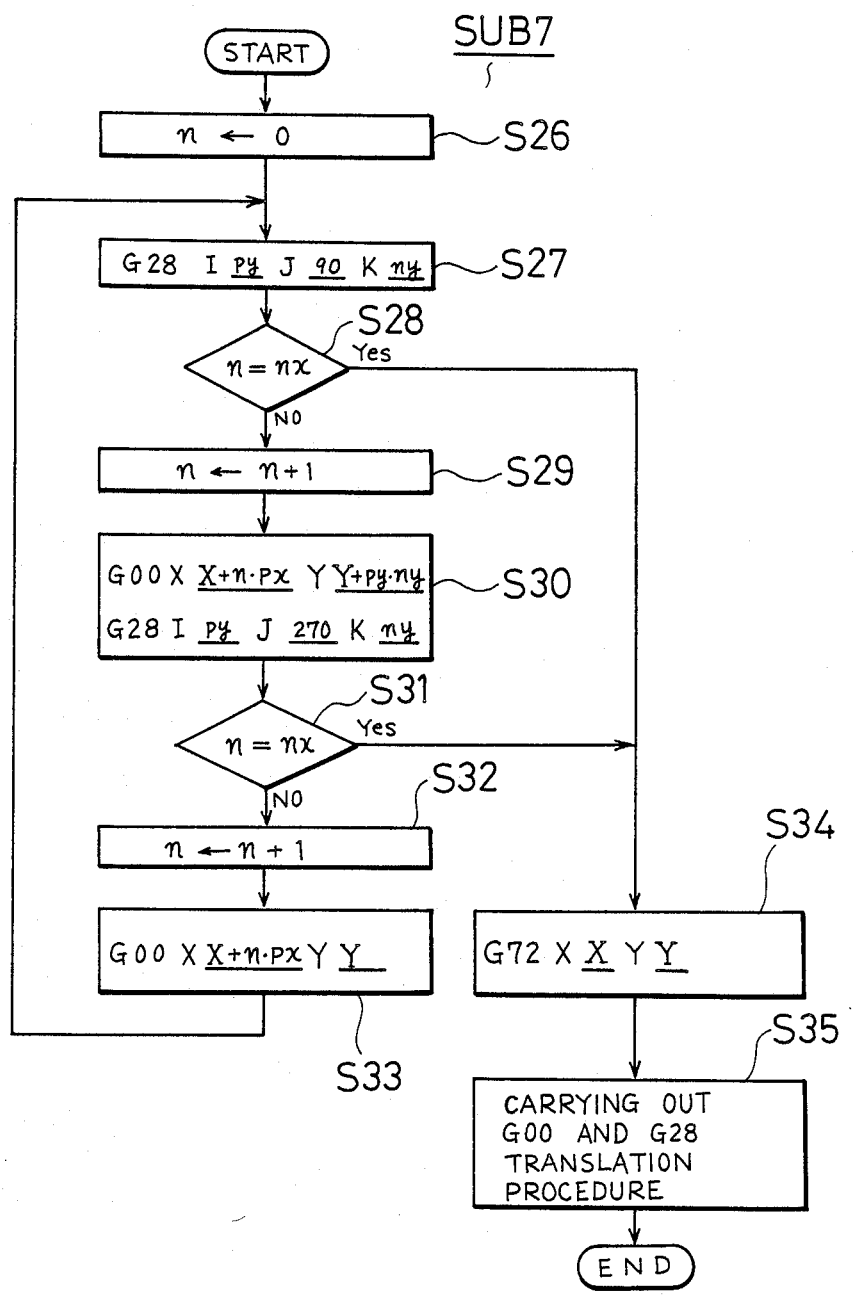

G26, as shown in FIG. 27, denotes a punching action for punching k pieces of hole on a predetermined circumference with a radius I and a start angle J around a reference point SP′ (coordinate X,Y) which was set according to a reference point setting command of G72, and the command thereof is carried out in the form of;

G26 I r Jθ K n Tα wherein r, θ, and n denote specific coordinates, and α denotes a tool number TNO of a mold to be used.

(c) G28 (sequence of points)

Figure 8:
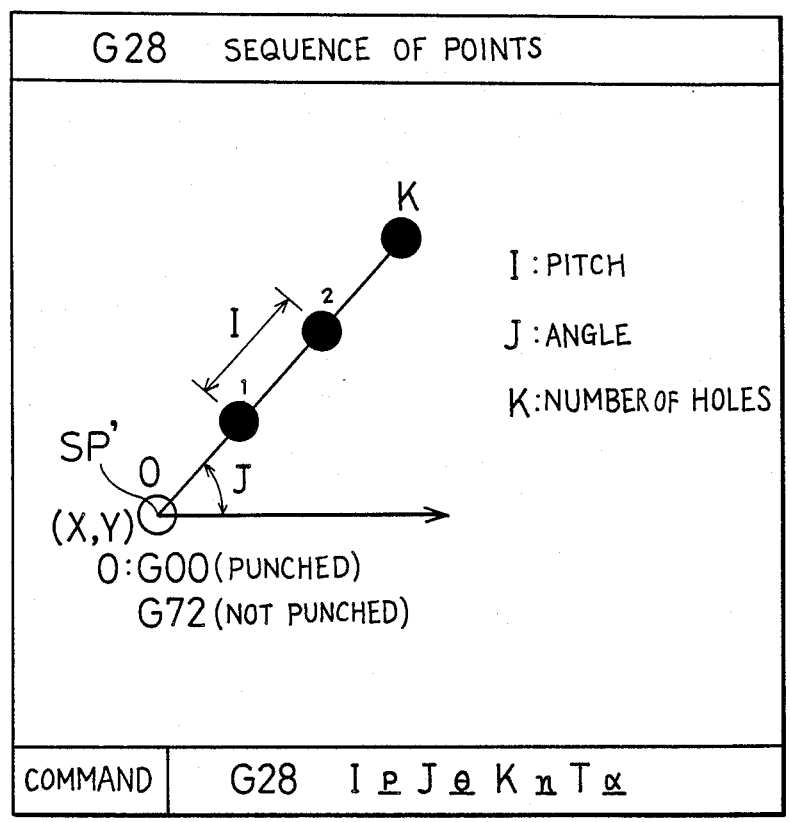

G28, as shown in FIG. 8, denotes a punching action for punching K pieces of hole on a predetermined line with an angle J around a reference point SP′ (coordinate X, Y) with a pitch I, and the command thereof is carried out in the form of G28 I p Jθ K n Tα wherein p, θ, and n denote specific numeral values, and α denotes a tool number TNO of a mold to be used. In the case a reference point SP′ is to be punched, the reference point SP′ is commanded by G00 in the block preceding G28. In the case a reference point SP′ is not to be punched, the reference point SP′ is commanded by G72 (reference point setting act ion without accompanying a punching action).

(d) G29 (arc)

Figure 9:
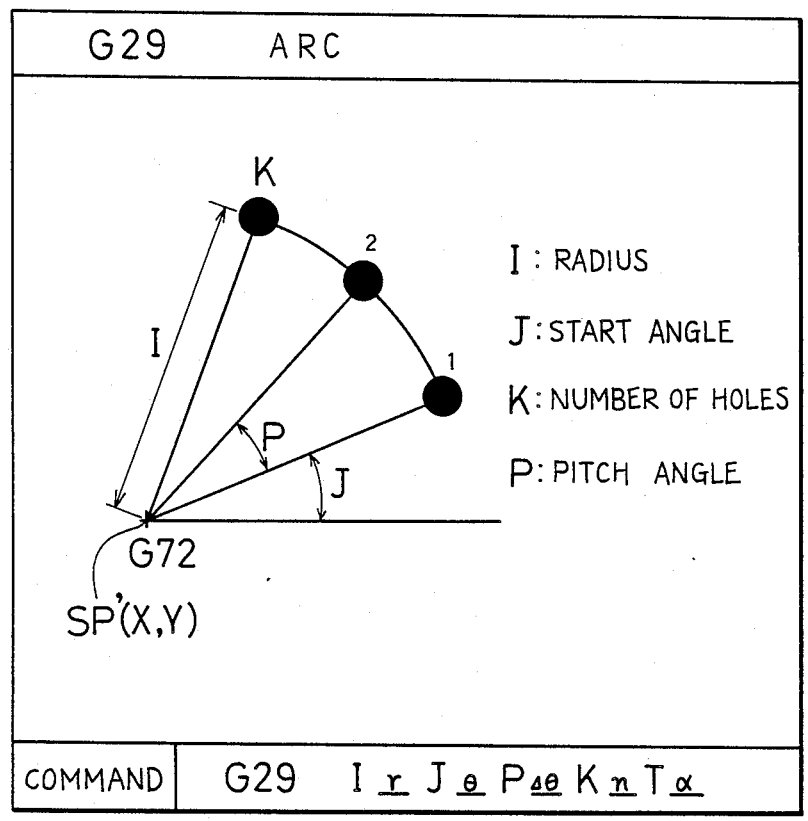

G29, as shown in FIG. 9, denotes a punching action for punching K pieces of holes on a predetermined circumference with a radius I, a punch start angle J, and a pitch angle P around a reference point SP′ (the coordinate X, Y which are set according to G72 command), and the command thereof is carried out in the form of;

G29 I r Jθ PΔθ K n Yα wherein r, θ, Δθ, and n denote specific numeric values and α denotes a tool number TNO of a mold to be used.

(e) G35 (square)

Figure 10:
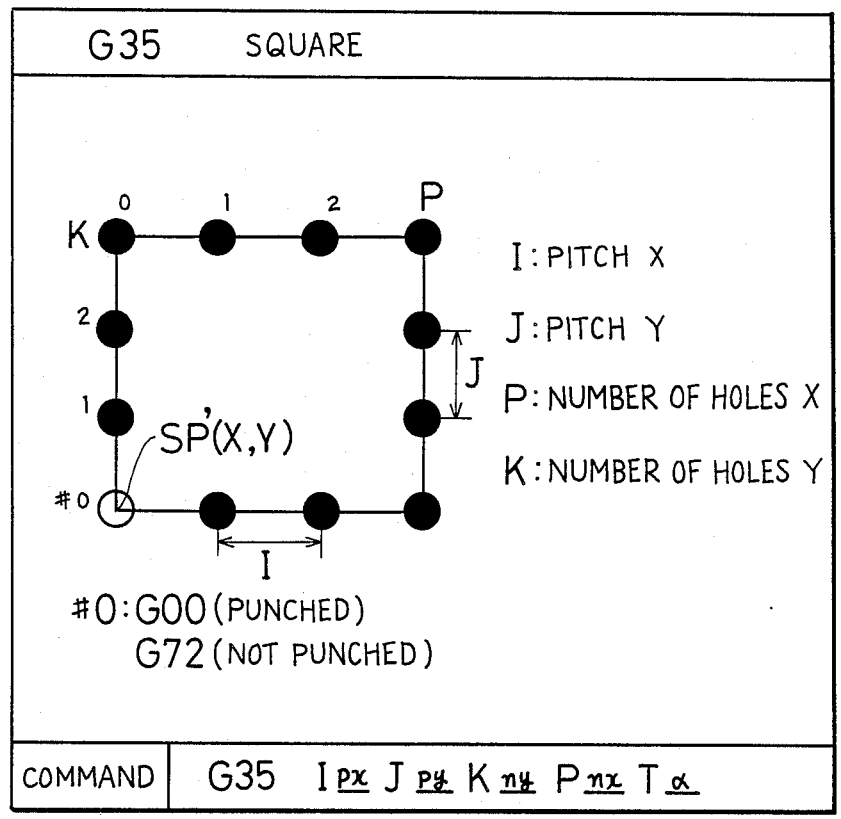

G35, as shown in FIG. 10, denotes a punching action for punching P pieces of hole in the X axis direction and K pieces of hole in the Y axis direction with a pitch I in the X axis direction and a pitch J in the Y axis direction around a reference point SP′ (coordinate, X, Y) on a square line, and the command thereof is carried out in the form of;

G35 I px J py K ny P nx Tα wherein px, py, ny, and nx denote specific numerical values, and α denotes a tool number TNO of a mold to be used. In the case a reference point SP′ is to be punched, the reference point SP′ is commanded by G00 in the block preceding G35. In the case, a reference point SP′ is not to be punched, the reference point SP′ is commanded by G72 (reference point setting action without accompanying a punching action).

(f) G36 (grit X)

Figure 11:
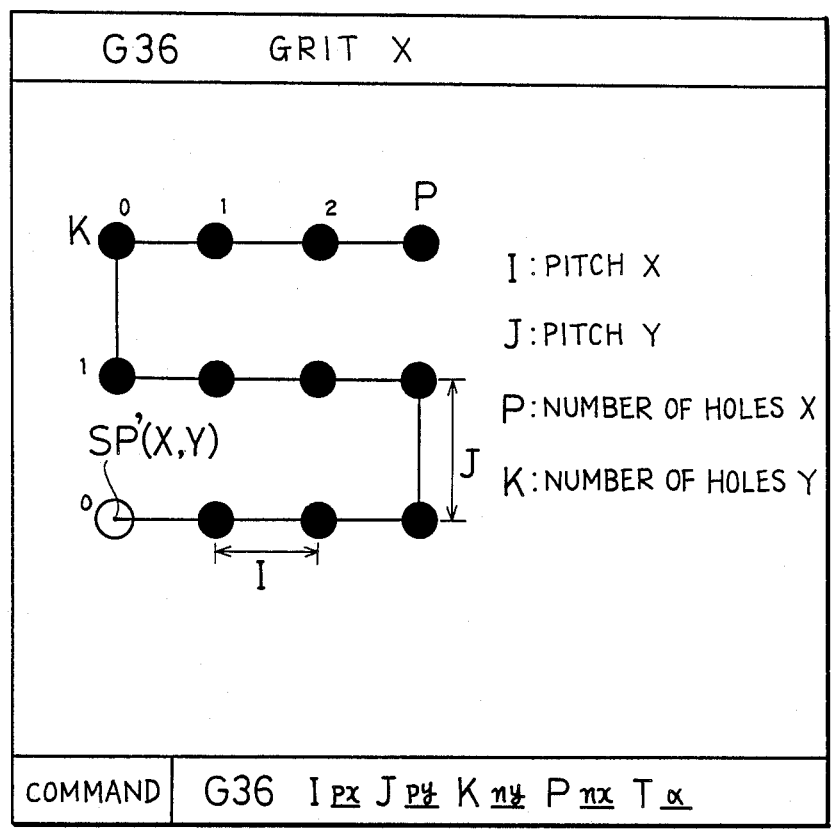

G36, as shown in FIG. 11, denotes a punching action for punching P pieces of hole in the X axis direction and K pieces of hole in the Y axis direction with a pitch I in the X axis direction and a pitch J in the Y axis direction around a reference point SP' (coordinate X, Y) by moving a punch in the X axis direction first, and the command thereof is carried out in the form of;

G36 I px J py K ny P nx Tα wherein px, py, ny, and nx denote specific numeral numbers, and α denotes a tool number TNO of a mold to be used. In the case a reference point SP' is to be punched, the reference point SP' is commanded by G00 in the block preceding G36. In the case a reference point SP' is not to be punched, the reference point SP' is commanded by G72 (reference point setting action without a punching action).

(g) G37 (grit Y)

Figure 12:
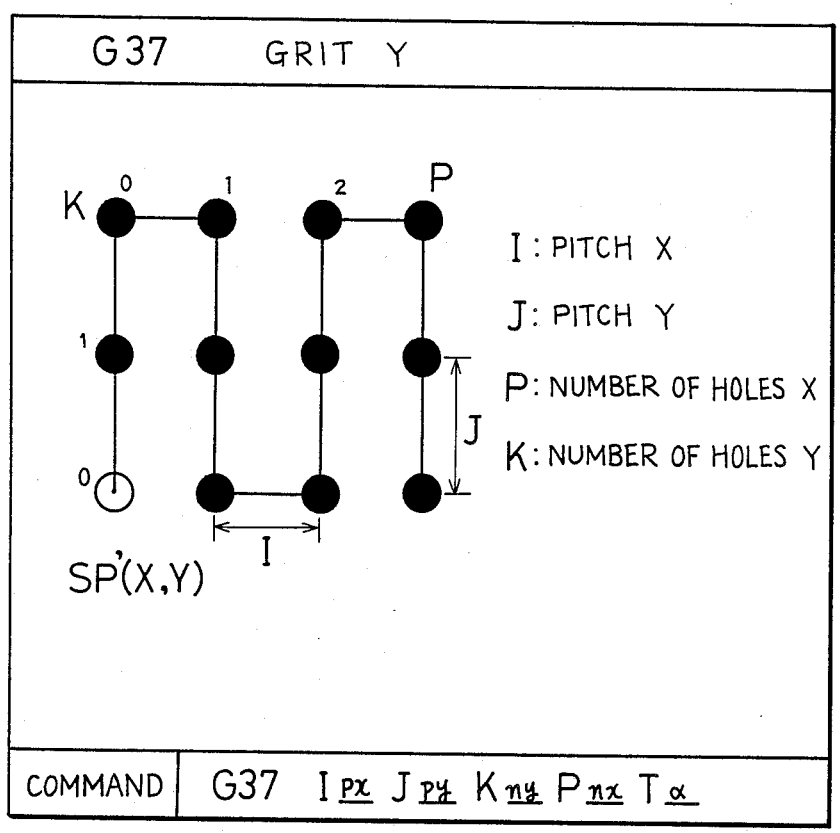

G37, as shown in FIG. 12, denotes a punching action for punching P pieces of hole in the X axis direction and K pieces of hole in the Y axis direction with a pitch I in the X axis direction and a pitch J in the Y axis direction around a reference point SP' (coordinate X, Y) by moving a punch in the Y axis direction first, and the command thereof is carried out in the form of;

G37 I px J py K ny P nx Tα wherein px, py, ny, and nx denote specific numeral numbers, and α denotes a tool number TNO of a mold to be used. In the case where a reference point SP' is to be punched, the reference point SP' is commanded by G00 in the block preceding G37. In the case where a reference point SP' is not to be punched, the reference point SP' is commanded by G72 (reference point setting action without a punching action).

(h) G63 (entire square area punched)

Figure 13:
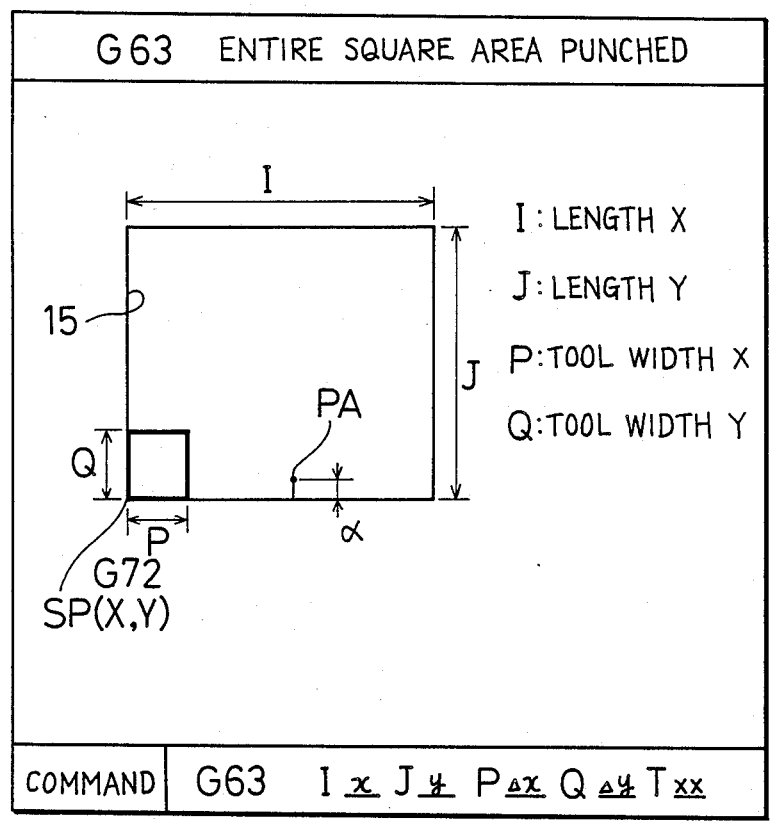

G63, as shown in FIG. 13, denotes a punching action for punching a square hole having the length I in the X axis direction and the length J in the Y axis direction with reference to a reference point SP (coordinate X, Y which is set by G72 command) using a tool having the tool width P in the X axis direction and the tool width Q in the Y axis direction, and the command thereof is carried out in the form of;

G63 I x J y P Δx Q Δy T xx wherein x, y, Δx, and Δy denote specific numeral values, and xx denotes a tool number TNO of a mold to be used.

(i) G66 (share proof)

Figure 14:
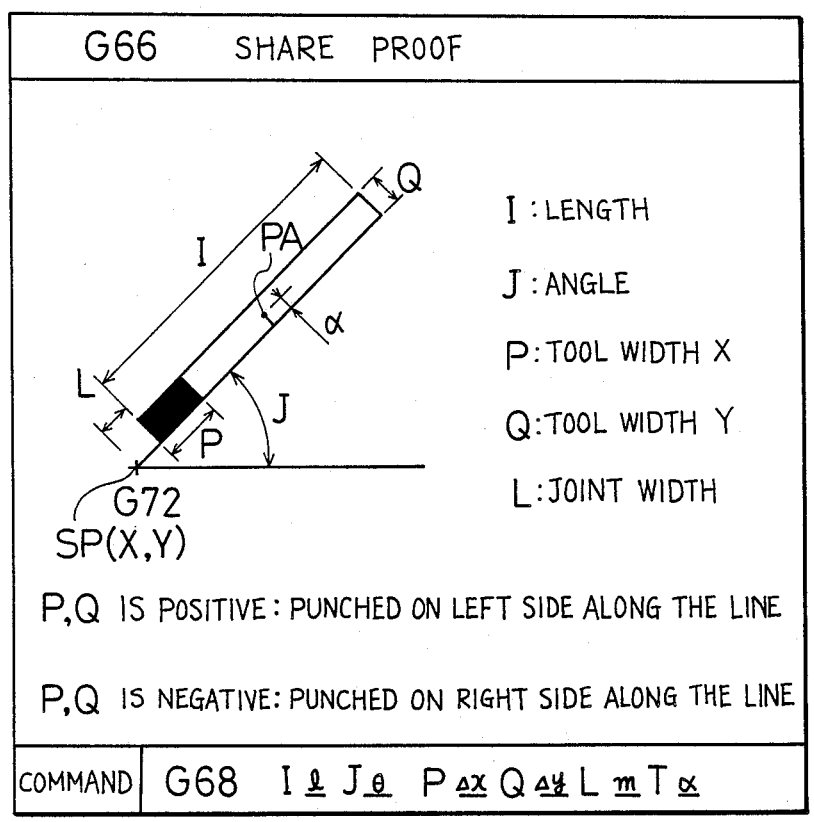

G66, as shown in FIG. 14, denotes a punching action for punching a square hole having the length I, the angle J and the joint width L with reference to a reference point SP (the coordinate X, Y which is set by G72 command) using a tool having the tool width P in the X axis direction and the tool width Q in the Y axis direction, and the command thereof is carried out in the form of;

G66 I l J θ PΔx QΔy L m Tα wherein l, θ, Δx, Δy, and m denote specific numeral values, and α denotes a tool number TNO of a mold to be used.

(j) G67 (rectangle)

Figure 15:
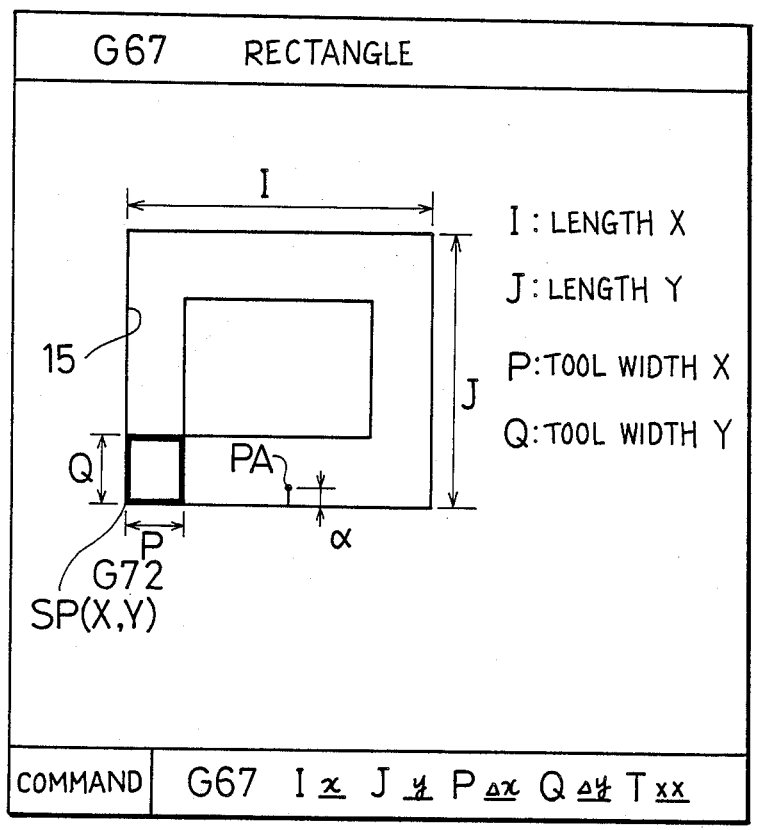

G67, as shown in FIG. 15, denotes a punching action for punching a square hole having the length I in the X axis direction and the length J in the Y axis direction with a square area at its central portion is left unmachined with reference to a reference point SP (the coordinate X, Y which is set by the G72 command) using a tool having the tool width P in the X axis direction and the tool width Q in the Y axis direction, and the command thereof is carried out in the form of;

G67 I x J y P Δx Q Δy T xx wherein x, y, Δx, and Δy denote specific numeral values, and xx denotes a tool number TNO of a mold to be used.

(k) (circular nibbling)

G78 (radius)

Figure 16:
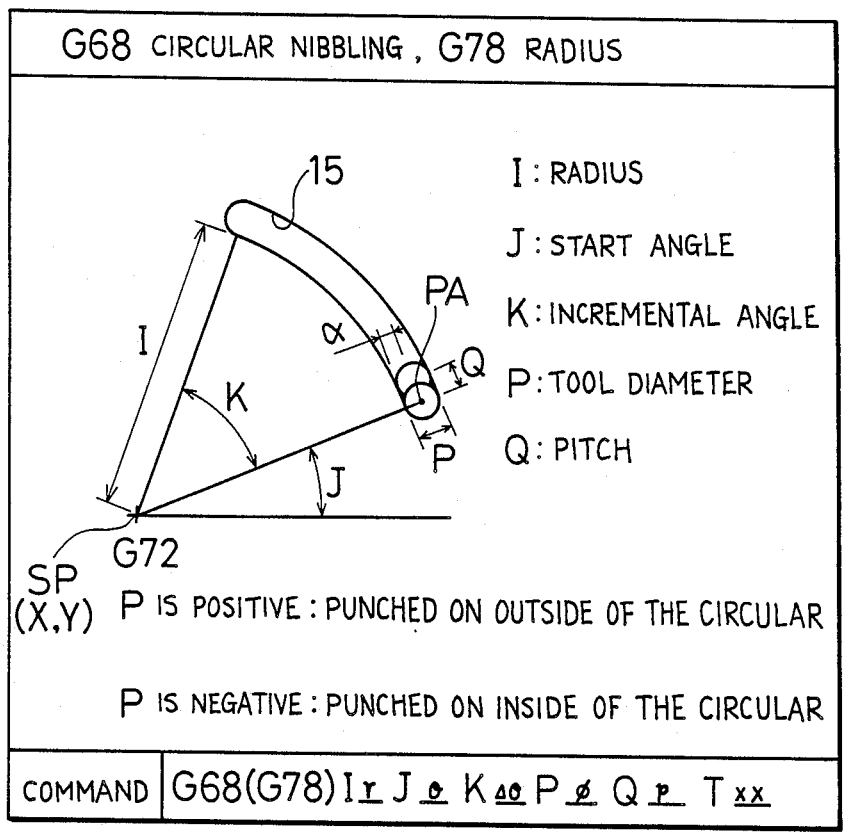

G68 and G78, as shown in FIG. 16, each denotes a punching action for punching a circular hole with the radius I, the punch start angle J, the incremental angle K, the tool diameter P and the pitch Q around a reference point SP (the coordinate X, Y which is set by G72 command), and the command thereof is carried out in the form of;

G68 (G78) I r J θ  K Δθ
          Pφ Q p T xx wherein r, θ, Δθ, φ, and p denote specific values, and xx denotes a tool number TNO of a mold to be used, G68 and G78 are a result of classification in view of difference in punch action control and their configurations to be machined are the same.

(l) G69 (linear nibbling)

G79 (cut at angle)

Figure 17:
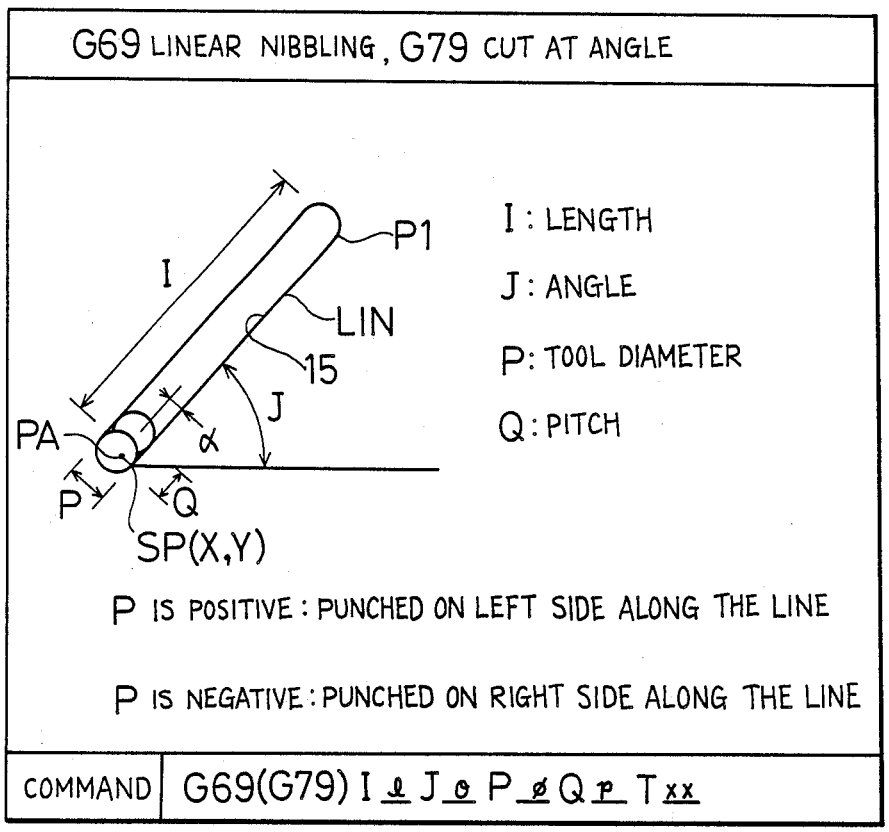

G69 and G79, as shown in FIG. 17, each denotes a punching action for punching a linear hole with the length I, the angle J, the tool diameter P and the pitch Q around a reference point SP (coordinate X, Y), and the command thereof is carried out in the form of;

G69 (G79) I l J θ Pφ Q p T xx wherein l, θ, φ, and p denote specific values, and xx denotes a tool number TNO of a mold to be used.

G69 and G79 are a result of classification in view of the difference in punch action control and wherein their configurations to be machined are the same.

In this way, when the operator inputs the machining DAT of the turret punch press in the form of a G code from the key board 6, these machining data DAT are stored in the punch press program memory 10 as a machining program PPR. Since this machining program PPR in its present form can be used only for a machining of the turret punch press, the main control section 2 commands the program translation calculating section 12 to translate the machining program PPR to another form which the laser beam machine can put into actual practice at the time point when the operator has completed the inputting operation of the machining data DAT and when the operator has completed the preparation of the machining program PPR for the turret punch press.

Upon receiving a command for translating the machining program PPR from the main control section 2, the program translation calculating section 12 reads the prepared machining program PPR regarding a turret punch press block by block from the punch press program memory 10 first, and then successively translates these blocks into a form which the laser beam machine can put into practice. More specifically, a machining path of the laser beam machine is generated by means of calculation from the machining program PPR and move commands MCD, which show such generated machining path, are successively stored in the translation program memory 13.

Figure 21:
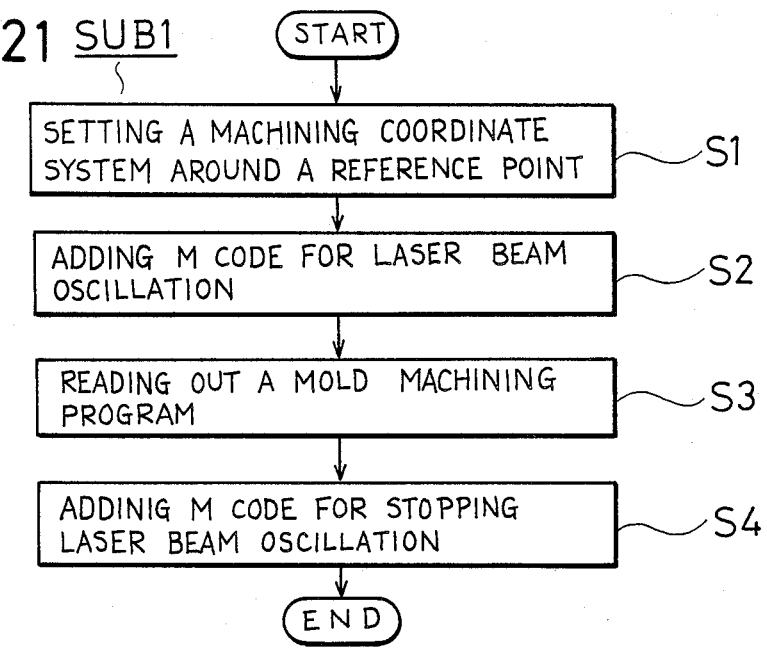
FIGS. 21 through 31 are flow charts showing one example of a translation program for generating a machining path for use of the laser beam machine from the machining command of the turret punch press shown in FIGS. 6 through 17.

That is, in the case the block, which was read by the program translation calculating section 12, is, for example, the G00 (single punch) command shown in FIG. 6, the program translation calculating section 12 reads a subroutine SUB1 from the system program memory 11. The subrotine SUB1, as shown in FIG. 21, is a program for translating the G00 command to a move command for use of the laser beam machine. In step S1, a setting action of a machining coordinate system is performed with reference to a punch position (x, Y) which is instructed by the G00 command as a reference point.

Since the reference point is different depending on tools, the program translation calculating section 12 reads a mold machining program MMP corresponding a tool, which has the tool number of a mold to be used which is commanded by the G00 command, from the mold machining program memory 8.

Figure 18:
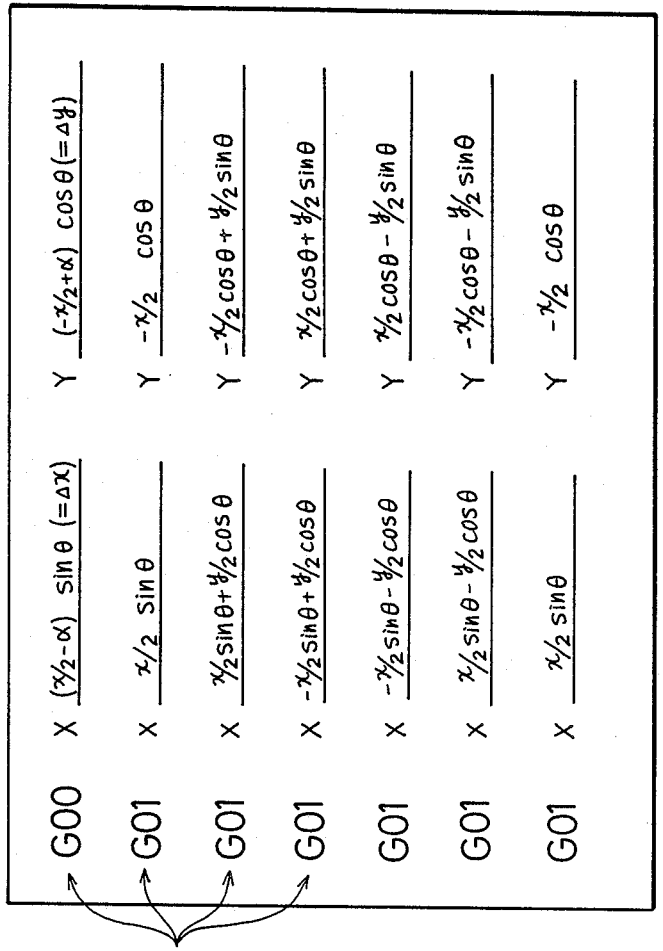
FIGS. 18 through 20 are views showing one example of a mold machining program which is used when the punching of FIGS. 3 through 5 is performed using the laser beam machine.
Figure 19:
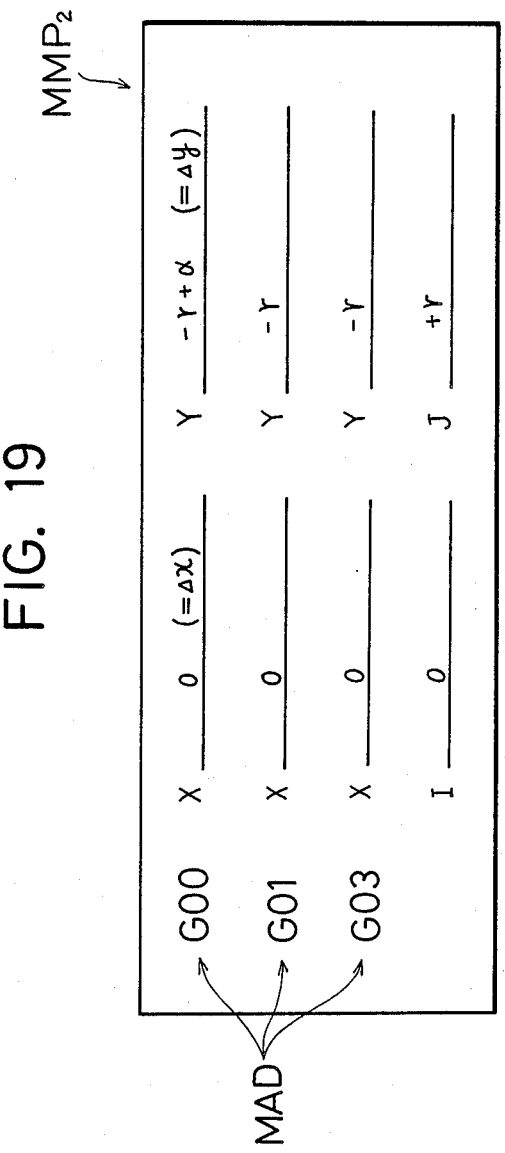
Figure 20:
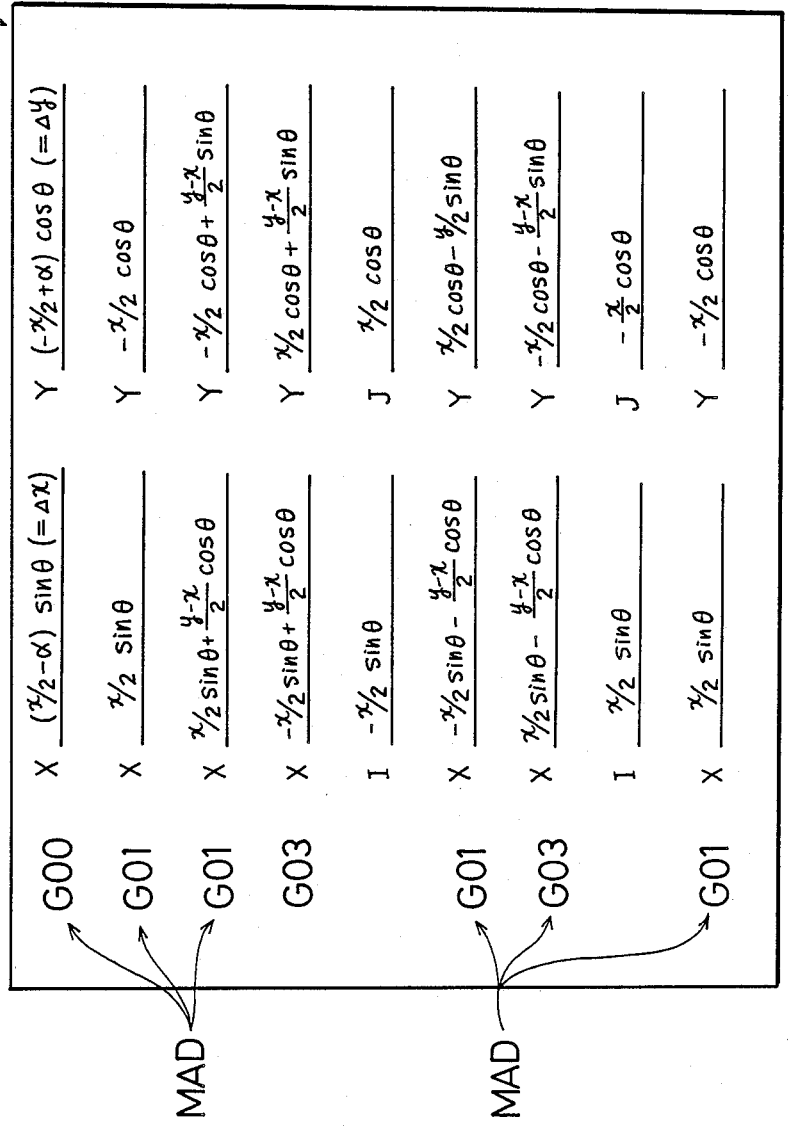

That is, the mold machining programs MMP$_1$ to MMP$_3$, etc. corresponding to the molds having various configurations as shown, for example, in FIGS. 18 through 20 are stored in the mold machining program MMP. The mold machining program MMP$_1$ (see FIG. 18) is a program comprising a plurality of move commands MAD for machining a hole having the same configuration as punched by a mold (mold having a punched configuration of square and which is set as vertical size x, horizontal size y and rotation angle $\theta$) having the size as shown in FIG. 3 by the laser beam machine. This mold machining program MMP$_1$ has the reference point SP (original point of the program) which is set in a central portion of the hole 15 to be machined. Accordingly, by designating the coordinate position of the reference point SP, the machining path for machining the hole 15 can be immediately established by the mold machining program MMP$_1$. The point PA of FIG. 3 is the laser beam machinig start position, i.e., piercing position. Of G codes in the mold machining program MMP, G00 means rapid feed, G01 means linear interpolation, G02 means CW circular interpolation, and G03 means CCW circular interpolation.

Figure 4:
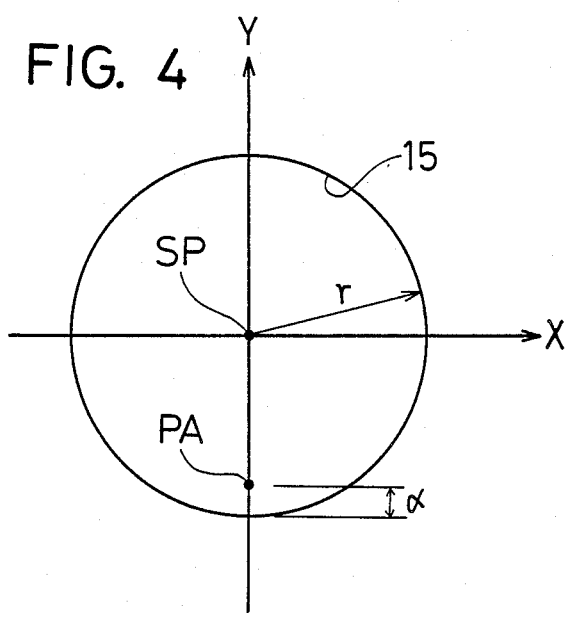

The mold machining program MMP$_2$ (see FIG. 19), as shown in FIG. 4, is a program comprising a plurality of move commands MAD for machining a hole having the same configuration as punched by a circular mold having a radius r by the laser beam machine. This mold machining program MMP$_2$ has a reference point SP which is set in a central portion of the hole 15 to be machined. Accordingly, the machining path for machining the hole 15 can be immediately calculated and established by the mold machining program MMP$_2$ merely by designating the coordinate position of the reference point SP. The point PA of FIG. 4 is the aforementioned piercing position.

Figure 5:
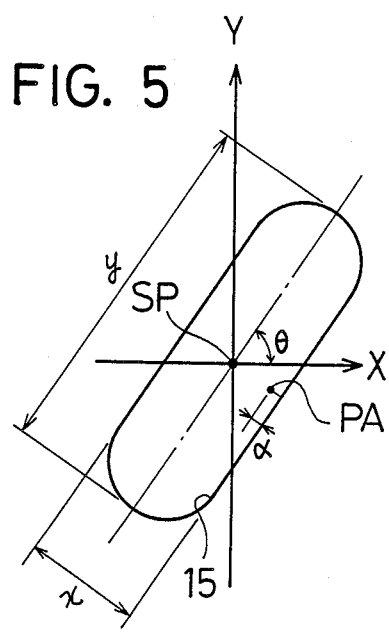

The mold machining program MMP$_3$ (see FIG. 20), as shown in FIG. 5, is a program comprising a plurality of move commands MAD for machining a hole having the same configuration as punched by an oblong mold having a vertical size x, a horizontal size y and a rotation angle $\theta$ of the mold by a laser beam machine. This mold machining program MMP$_3$ has a reference point SP which is set in a central portion of the hole 15 to be machined. Accordingly, the machining path for machining the hole 15 can be immediately calculated and established by the mold machining program MMP$_3$ merely by designating the coordinate position of the reference point SP. The point PA of FIG. 5 is the aforementioned piercing position.

In the step S1 of the subroutine SUB1 which is shown in FIG. 21, the coordinate translation action for setting the punch position (x, y) shown in the G00 single punch command of the turret punch press as the reference point SP of FIGS. 3 through 5 is performed, and the machining coordinate system is set by serving the punch position (x, y) as the original point of the program of the respective mold programs MMP.

Next, the subroutine SUB1 goes to the step S2, wherein the M code command for use of laser beam oscillation is processed in addition to the afore-mentioned rapid feed command G00. Furthermore, in the step S3, the mold machining program MMP, which corresponds to the tool number $\alpha$ which has been instructed by the G00 single punch command in the machining program PPR of the turret punch press, is read out and is connected after the M code command which is generated in the step S2. Due to the foregoing, in the laser beam machine, the reference points SP of the respective mold machining programs MMP are set as the original point of the program according to the machining coordinate which was set in the step 1, the laser beam oscillator is driven in the step S2, and the machining program for use of the laser beam machine, which is adapted to machine the hole 15 corresponding to a predetermined mold according to the mold machining program MMP, is stored in the translation program memory 13 in the step 3. Since the respective mold machining programs MMP are set serving the reference positions on the programs, i.e., original point of the program, of the respective programs MMP as the original point of the coordinate system by the setting action of the machining coordinate system in the step S1, the programs MMP can be immediately run without changing the coordinate, etc. furthermore.

In this way, when the machining program of the hole 15 corresponding to the mold is stored in the translation program memory 13, in the step S4, an M code for commanding the stop of the laser beam oscillation is added, and the translation of the machining program for use of the laser beam machine corresponding to the machining command of one block of the turret punch press is completed.

Figure 7:
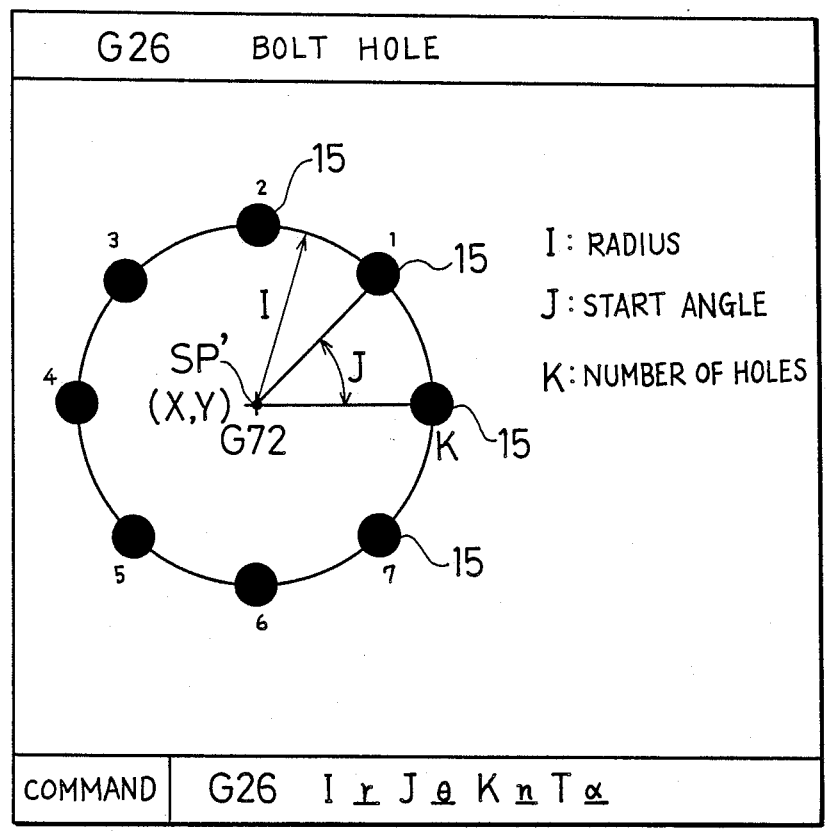

In this way, when the translation for the portion of one block has been completed, the program translation calculating section 12 reads a succeeding block regarding the machining content of the turret punch press from the machining program PPR in the punch press program memory 10. (Accordingly, it skips reading a command which has no relation with the machining content such as control command, etc. but modes of reading can be performed according to necessity). Next, in the case where the block, which is to be read next, is the command of the G26 (bolt hole) shown in FIG. 7, the program translation calculating section 12 reads the subroutine SUB2 from the system program memory 11.

Figure 22:
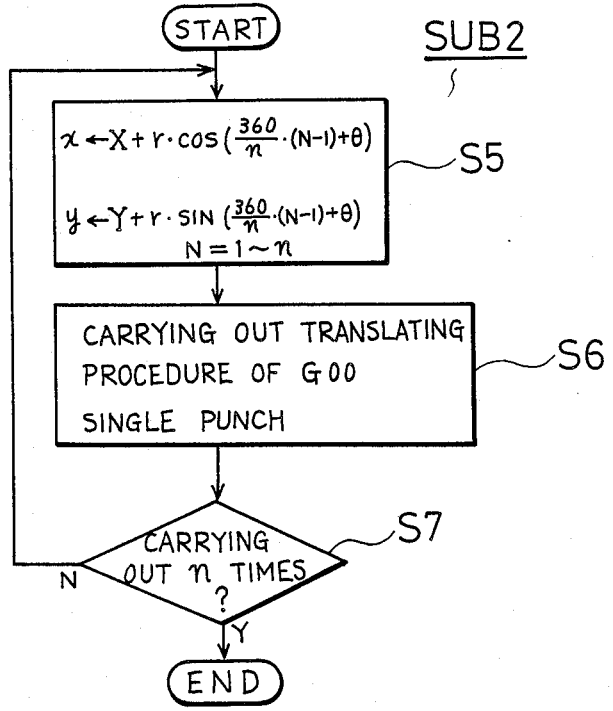

The subroutine SUB2, as shown in FIG. 22, is a program for translating the G26 command of the turret punch press to a move command for use of the laser beam machine. In the step S5, firstly, a coordinate position in the center of each of n pieces of hole 15 to be machined is calculated from the coordinate (x, y) of a reference point SP' which was set according to a reference point setting command by the G72 which was instructed by the block immediate before the G26 command, and such calculated coordinate positions are determined as reference points SP for machining the respective holes using laser beam. Nextly, it goes to the step S6, wherein based on the central positions of the respective holes 15 calculated, the translating procedures from the steps S1 to S4 of the subroutine SUB1 are carried out.

That is, in the subroutine SUB1, if the central position as a reference point SP of the hole 15 and the tool number α are known, a machining path for use of the laser beam machine is immediately generated for that particular hole 15. Accordingly, in the step S5, a move command for each of the holes 15 can be immediately generated by calculating the coordinate position of the reference point SP for machining using laser beam with respect to each hole 15 which comprises the bolt hole. In this way, in the step S7, when a move command is generated for each of n pieces of hole 15 of the bolt hole, a machining program by the laser beam machine, which corresponds to the bolt hole machining by the turret punch press, is prepared in the translation program memory 13.

In the case the block, which is to be read by the program translation calculating section 12 next, is the command of the G28 (sequence of points) shown in FIG. 8, the program translation calculating section 12 reads the subroutine SUB3 from the system program memory 11.

The subroutine SUB3 is a program for translating the G28 command to a move command for use of the laser beam machine. In the step S8, firstly, a coordinate position of the center of each of n pieces of hole 15 to be machined is calculated from the coordinate (x, y) of the reference point SP' which was set by a reference point setting command by the G72 or G00 which was instructed by the block immediately before the G28 command (in the case of the G00 command, a translation is carried out by the subroutine SUB1 based on the G00 command, and a machining is also performed with respect to the reference point SP'). Next, it goes to the step S9, wherein, as in the case of the subroutine SUB2, the machining coordinate system is set by serving the central position of each hole 15 calculated as the reference point SP for laser beam machining, the translation procedures from the steps S1 to S4 of the subroutine SUB1 are carried out, a move command for each of n pieces of hole 15 which constitutes a sequence of points is generated, and a machining program by the laser beam machine which corresponds to the machining of sequence of points of the turret punch press is prepared in the translation program memory 13.

In the case the block, which is to be read by the program translation calculating section 12 next, is, for example, the G29 (arc) command as shown in FIG. 9, the program translation calculating section 12 reads the subroutine SUB4 from the system program memory 11.

The subroutine SUB4 is a program for translating the G29 command to a move command for use of the laser beam machine. In the step S11, a coordinate position of the center of each of n pieces of hole 15 to be machined is calculated from the coordinate (x, y) of the reference point SP' which was set by a reference point setting command by the G72 which was instructed by the block immediately before the G29 command. Next, it goes to the step S12, wherein, as in the case of the subroutine SUB2, the machining coordinate system is set by serving the central position of each hole 15 calculated as the reference point SP for laser beam machining, the translation procedures from the steps S1 to S4 of the subroutine SUB1 are carried out, a move command for each of n pieces of hole 15 which constitutes a arc is generated, and a machining program by the laser beam machine which corresponds to the arc machining of the turret punch press is prepared in the translation program memory 13.

In the case the block, which is to be read by the program translation calculating section 12 next, is, for example, the G35 (suquare) command as shown in FIG. 10, the program translation calculating section 12 reads the subroutine SUB5 from the system program memory 11.

Figure 23:
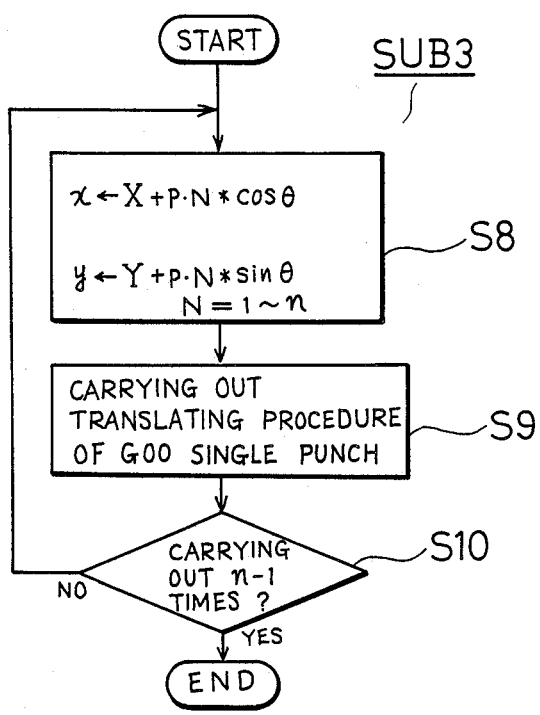
Figure 24:
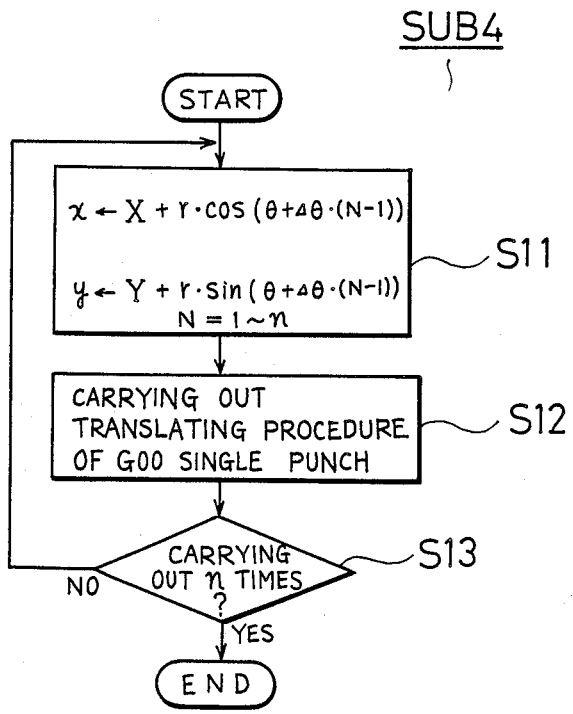
Figure 25:
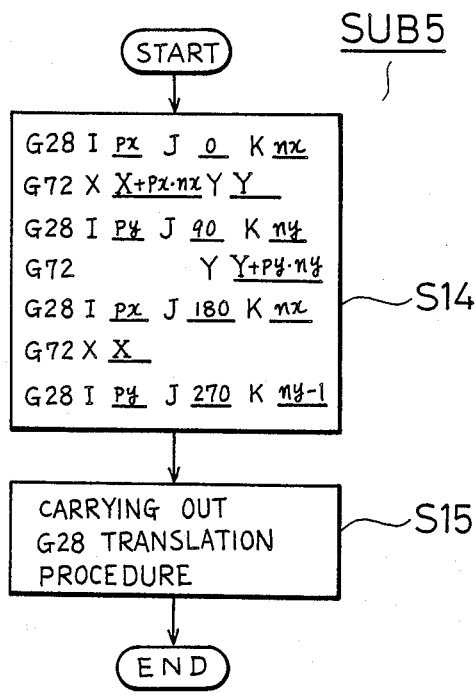

The subroutine SUB5, as shown in FIG. 25, is a program for translating the G35 command to the move command for use of the laser beam machine. In the step S14, firstly, the G35 command is translated to a combination command of the G28 and G72 commands regarding the machining by the G35 command as a combination of the G28 (sequence of points) and G72 (reference point setting) in the turret punch press. Then, in the step S15, based on the afore-mentioned translation procedure (subroutine SUB3 shown in FIG. 23) of the G28, the command is successively translated to a move command by the laser beam machine.

Furthermore, in the case the block, which is to be read by the program translation calculating section 12 next, is, for example, the G36 (grit X) command shown in FIG. 11, the program translation calculating section 12 reads the subroutine SUB6 from the system program memory 11.

Figure 26:
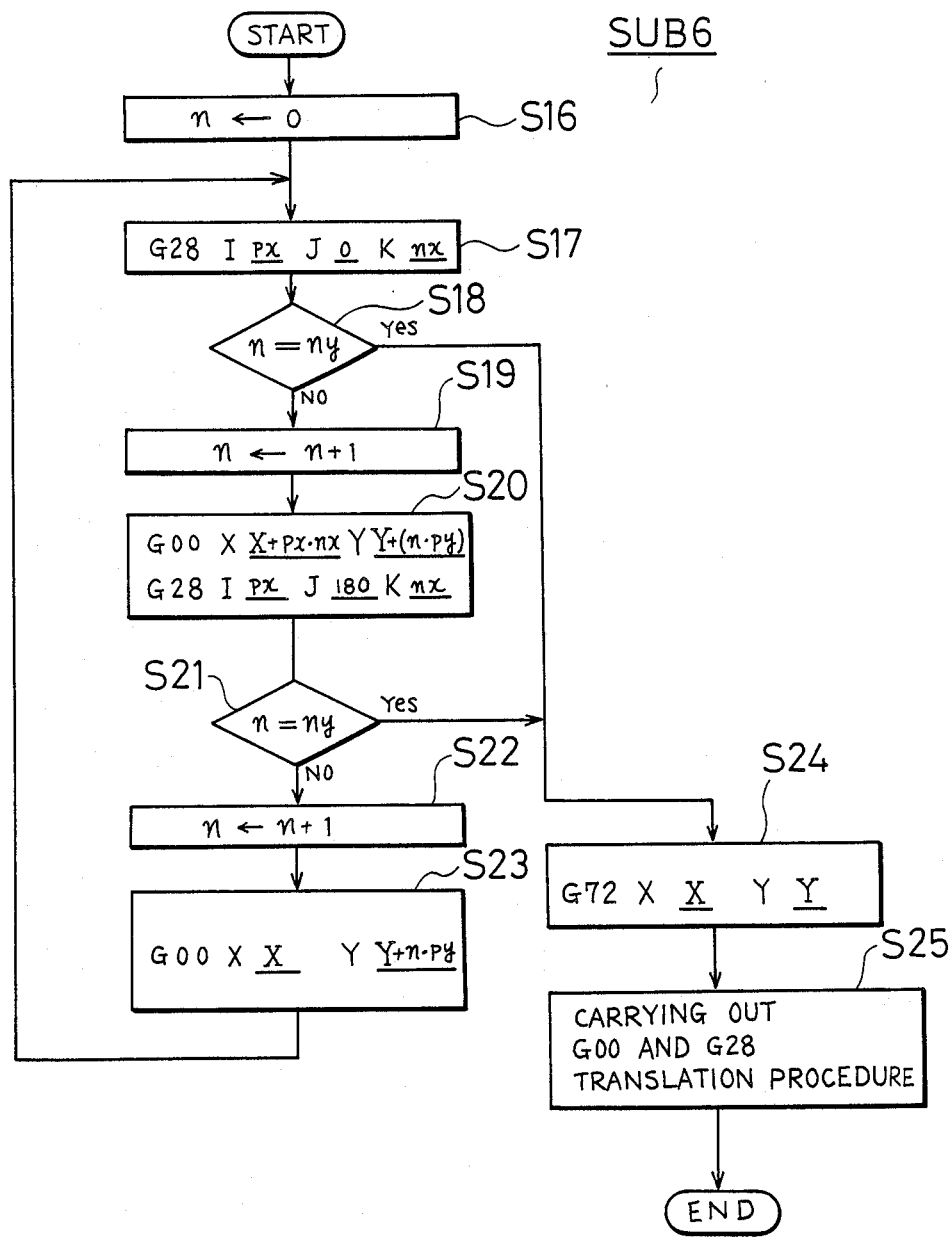

The subroutine SUB6, as shown in FIG. 26, is a program for translating the G36 command to a move command for use of the laser beam machine. In the steps S16 through S23, firstly, the G36 command is regarded as a combination of the G28 (sequence of points) and G00 (single punch) of the turret punch press, and disassociates the combination into a form of G28-G00-G28-G00 . . . , and finally, in the step S24, the torch is returned to the reference point SP' by the G72 of the turret punch press command. In this way, when the G36 command has been translated to other simple turret punch press command such as G28, G00, G72, etc., in the step S25, each command is translated to a command for use of the laser beam machine in the same procedure as already mentioned and stored in the translation program memory 13.

Furthermore, in the case the block, which is to be read by the program translation calculating section 12 next, is, for example, the G37 (grit Y) command shown in FIG. 12, the program translation calculating section 12 reads the subroutine SUB7 from the system program memory 11.

The subroutine SUB7, as shown in FIG. 27, is a program for translating the G37 command to a move command for use of the laser beam machine. In the steps S26 through S33, firstly, the G37 command is regarded as a combination of the G28 (sequence of points) and G00 (single punch) of the turret punch press, dissolves it into a form of G28-G00-G28-G00, and finally, in the step S34, the torch is returned to the reference point SP' by the G72 of the turret punch press command. In this way, when the G37 command has been translated to other more simple turret punch press command such as G28, G00, G72, etc., in the step S35, each command is translated to a command for use of the laser beam machine in the same procedure as already mentioned and stored in the translation program memory 13.

Furthermore, in the case the block, which is to read by the program translation calculating section 12 next, is, for example, the G63 (entire square area punched) command shown in FIG. 13 or the G67 (rectangle) command shown in FIG. 15, the program translation calculating section 12 reads the subroutine SUB8 from the system program memory 11.

Figure 28:
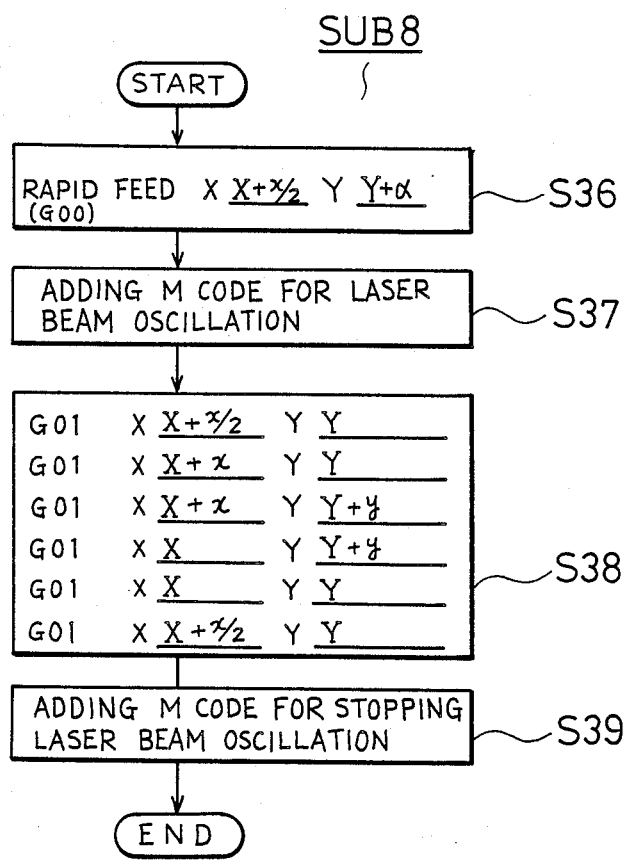

The subroutine SUB8, as shown in FIG. 28, is a program for translating the G63 or G67 command to a move command for use of the laser beam machine. In this case, the G63 and G67 are not distinguished as a machining configuration in the laser beam machine and become a program for machining a square hole 15 in the workpiece.

The subroutine SUB8, in the step S36, firstly, sets a piercing position PA with respect to the coordinate (X, Y) of the reference point SP, and then, in the step S37, a M code for laser beam oscillation is generated, and then, in the step S38, the G01 command (linear interpolation) by the laser beam machine is combined to generate a path for machining the hole 15 into a square configuration, and finally, in the step S39, an M code for stopping the laser beam oscillation is generated and stored in the translation program memory 13.

Furthermore, in the case the block, which is to be read by the program translation calculating section 12 next, is for example, the G66 (share proof) command shown in FIG. 14, the program translation calculating section 12 reads the subroutine SUB9 from the system program memory 11.

Figure 29:
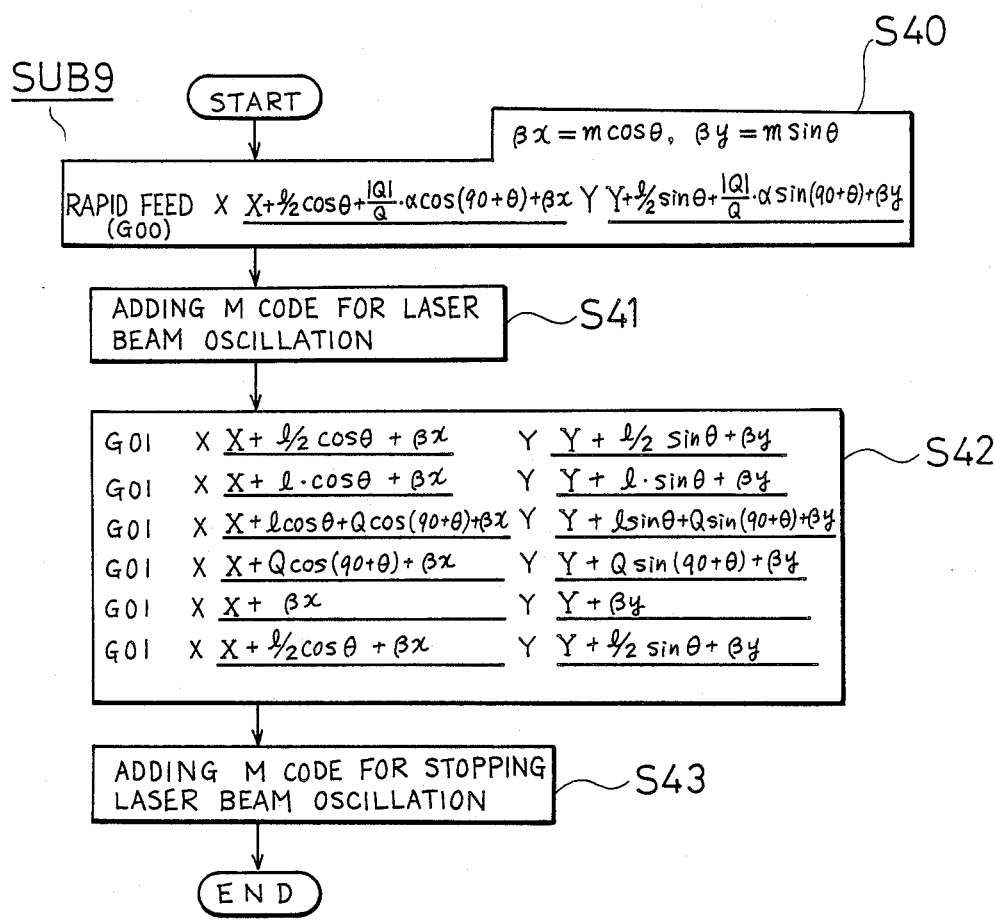

The subroutine SUB9, as shown in FIG. 29, is a program for translating the G66 command to a move command for use of the laser beam machine. In the step S40, the subroutine SUB9 sets a piercing position PA with respect to the coordinate (x, y) of the reference point SP first, and then, in the step S41, generates an M code for the laser beam oscillation, and then, in the step S42, combines the G01 command (linear interpolation) by the laser beam machine to generate a path for machining the hole 15 into a square configuration, and finally, in the step S43, an M code for stopping the laser beam oscillation is generated and stored in the translation program memory 13.

Furthermore, in the case the block, which is to read by the program translation calculating section 12 next, is, for example, the G68 (circular nibbling) command or G78 (radius) command shown in FIG. 16, the program translation calculating section 12 reads the subroutine SUB10 from the system program memory 11.

Figure 30:
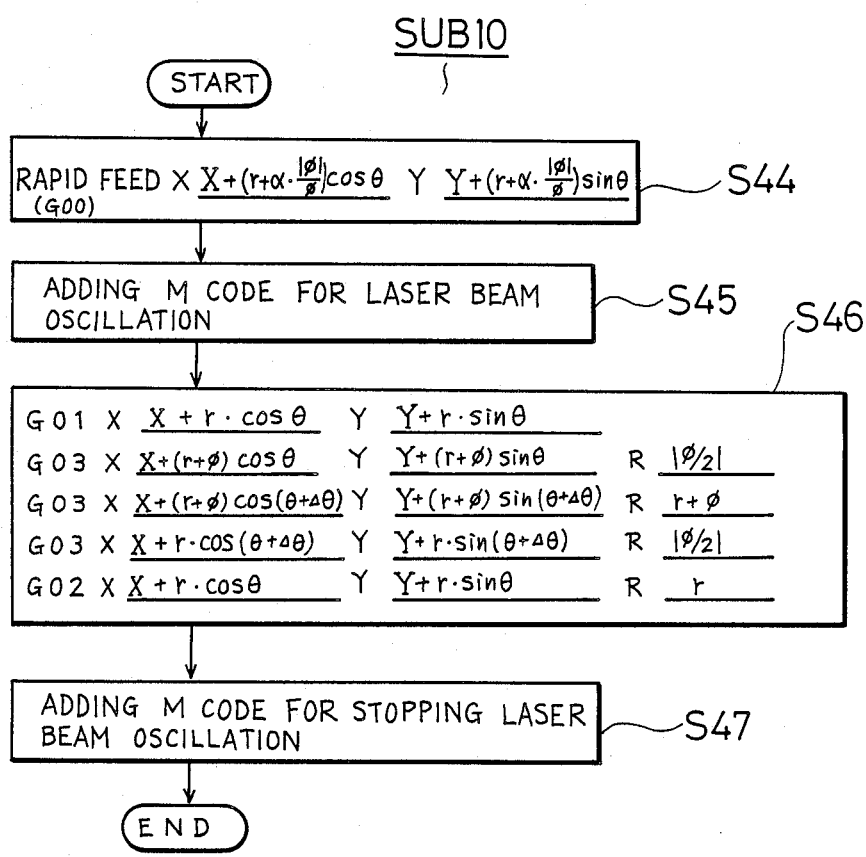

The subroutine SUB10, as shown in FIG. 30, is a program for translating the G68 and G78 commands to a move command for use of the laser beam machine. In the step S44, the subroutine SUB10 sets a piercing position PA with respect to the coordinate (x, y) of the reference point SP, and then, in the step S45, generates an M code for laser beam oscillation, and then, in the step S46, combines the G01 (linear interpolation), G03 (CCW circular interpolation) and G02 (CW circular interpolation) commands by the laser beam machine to generate a path for machining the hole 15 into a circular configuration, and finally, in the step S47, an M code for stopping laser beam oscillation is generated and stored in the translation program memory 13.

Furthermore, in the case the block, which is to be read by the program translation calculating section 12 next, is, for example, the G67 (linear nibbling) command or G79 (cut at angle) command shown in FIG. 17, the program translation calculating section 12 reads the subroutine SUB11 from the system program memory 11.

Figure 31:
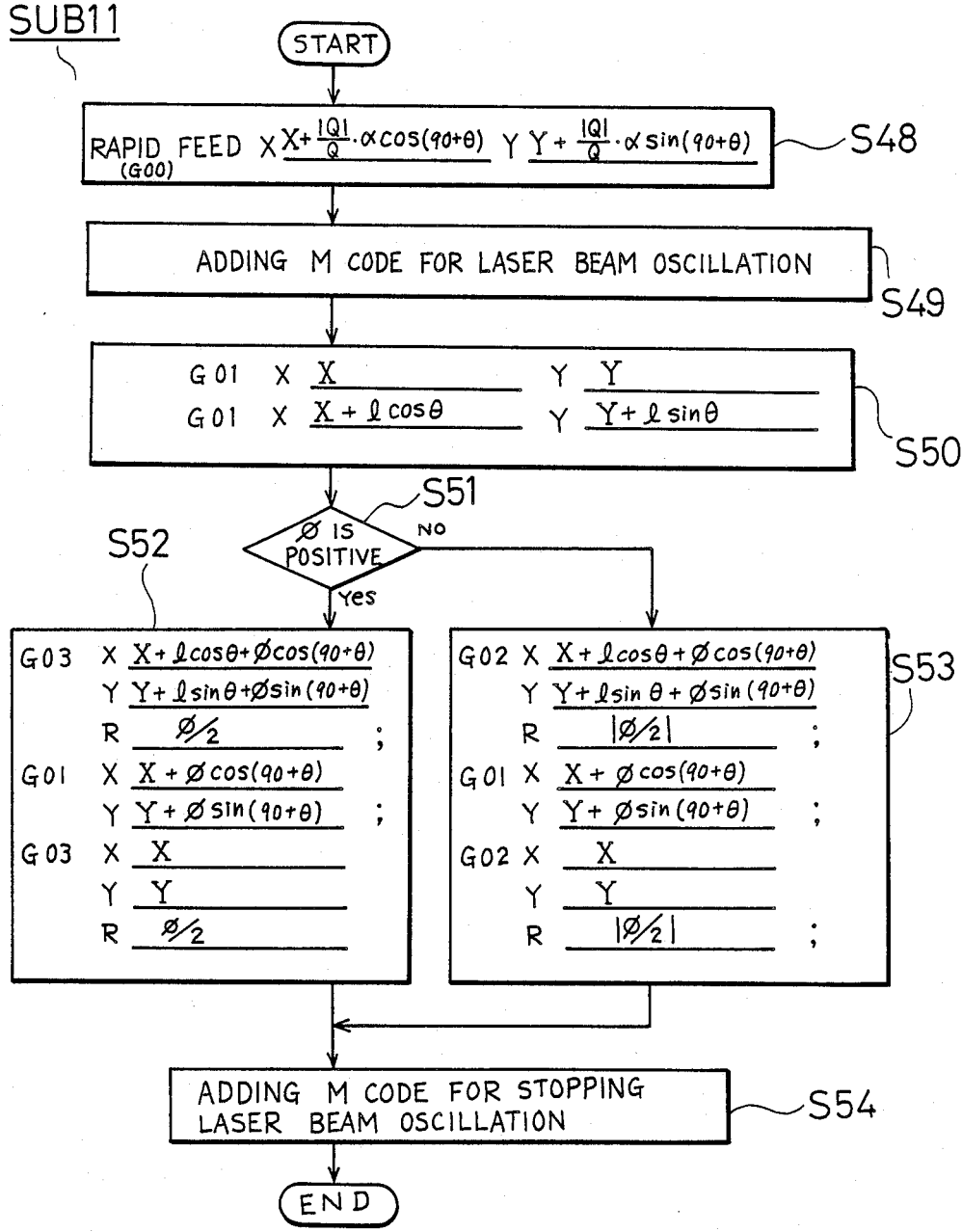

The subroutine SUB11, as shown in FIG. 31, is a program for translating the G69 and G79 commands to a move command for use of the laser beam machine. In the step S48, the subroutine SUB10 sets a piercing position PA with respect to the coordinate (x, y) of the reference point SP first, and then, in the step S49, generates an M code for laser beam oscillation, and then, in the step S50, generates a path extending so far as the position P1 (see FIG. 17) by the G01 (linear interpolation) command by the laser beam machine, and then, in the step S51, it selectively goes to the step S52 or step S53 depending on whether the hole 15 is at the right side of the reference line LIN or at the left side thereof, and properly combine the G01 (linear interpolation), G03 (CCW circular interpolation), and G02 (CW circular interpolation) commands to generate a path for machining the hole 15 into an oblong configuration, and finally, in the step S54, a M code for stopping laser beam oscillation is generated and stored in the translation program memory 13.

In this way, a machining path of the laser beam machine is successively generated by the program translation calculating section 12 based on the machining program PPR in the punch press program memory 10 and stored in the translation program memory 13. When translation for a certain machining program PPR in the punch press program memory 10 has been all completed, a machining program PRO of the laser beam machine, which is in the form corresponding to the machining program PPR in the punch press program memory 10, is generated in the translation program memory 13. Accordingly, when the main control section 2 issues a command for machining by the laser beam machine to the shaft control section 7 of the laser beam machine 1 based on the translated machining program PRO in the translation program memory 13, the shaft control section 7 immediately carries out a laser beam machining which corresponds to the turret punch press machining. Since the commands stored in the translation program memory 13 all comprise a command such as a G code which the laser beam machine can put into practice, the machining by the laser beam machine can be smoothly carried out.

In the above embodiment, the action for translating the machining program of the turret punch press to a program which the laser beam machine can put into practice is carried out by the program translation calculating section 12, etc. which are built in the laser beam machine 1. However, this translating action does not necessarily have to be carried out within the laser beam machine. The present invention is equally applicable regardless whether the translation of the machining program is performed within the laser beam machine or whether the translation of the machining program is performed by appropriate means outside of the laser beam machine, as long as the laser beam machine is directly drive controlled by a machining program of the turret punch press.

Although the present invention has been described with reference to the preferred embodiments, the embodiments described herein are for illustrative purposes only and not in limitation thereof. Also, the scope of the present invention is defined in the appended claims and will not be bound by the description of the embodiments. Accordingly, it will be understood that all changes and modifications which belong to the appended claims fall within the true spirit and scope of the present invention.

What is claimed is:

1. A drive control method of a laser beam machine comprising the steps of:
    translating a machining program, prepared for a turret punch press, to a machining program for a laser beam machine, and,
    drive-controlling said laser beam machine according to such translated machining program.

2. A drive control method of a laser beam machine as claimed in claim 1, wherein said translation of the machining program, prepared for use with the turret punch press, to said machining program for use of said laser beam machine is performed within the laser beam machine.

3. A drive control method of a laser beam machine as claimed in claim 1, wherein said translation of the machining program, prepared for use with the turret punch press, to said machining program for use of said laser beam machine is performed within an apparatus which is independent from said laser beam machine.

4. A program translating apparatus for use of a laser beam machine, comprising;
    a first memory means for storing a mold machining program which is used for machining a hole using a laser beam machine, said machining hole corresponding to the configuration of a punched hole which is formed by each mold of a turret punch press, and,
    second memory means for storing first translation program groups adapted to calculate the position of each hole when one or more holes are machined using the same mold, and to generate a machining path for the laser beam machine according to the mold machining program which is stored in said first memory means with reference to said calculated hole position, and
    third memory means for storing second translation program groups adapted to generate a machining path used when a predetermined area which is successively machined by the turret punch press, is machined by the laser beam machine, and,
    program translation calculating means for reading out the first and second translation program groups, which are stored in said second and third memory means, according to a machining program of the turret punch press and generating a machining path of said laser beam machine from the machining program of the turret punch press according to said first and second translation program groups.

5. A program translating apparatus for use of a laser beam machine as claimed in claim 4, wherein said program translating apparatus for use of a laser beam machine is built in to said laser beam machine.

6. A program translating apparatus for use of a laser beam machine as claimed in claim 4, wherein said program translating apparatus for use of a laser beam machine is provided separately from said laser beam machine.

* * * * *